April 25, 1933.　　　J. V. GIESLER　　　1,905,583
FLEXIBLE CORRUGATED TUBULAR WALL
Filed May 16, 1927
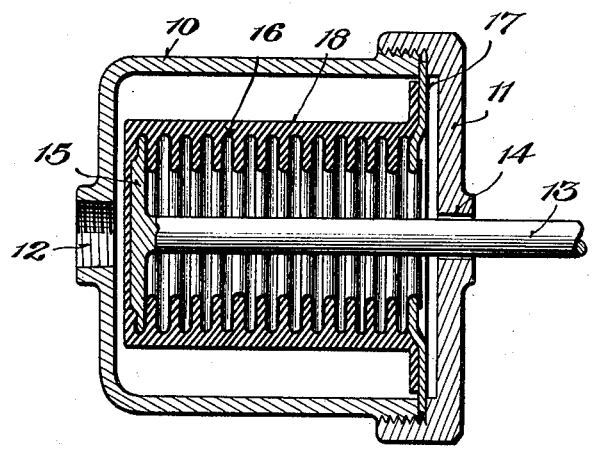
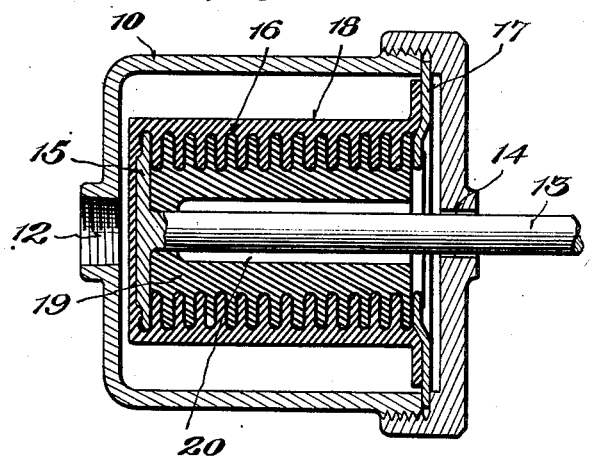
Inventor
By Jean V. Giesler
Cameron, Kirkam & Sutton
Attorneys Patented Apr. 25, 1933

1,905,583

UNITED STATES PATENT OFFICE

JEAN V. GIESLER, OF KNOXVILLE, TENNESSEE, ASSIGNOR TO THE FULTON SYLPHON COMPANY, OF KNOXVILLE, TENNESSEE, A CORPORATION OF DELAWARE

FLEXIBLE CORRUGATED TUBULAR WALL

Application filed May 16, 1927. Serial No. 191,826.

This invention relates to flexible, corrugated, tubular walls or bellows.

Flexible corrugated tubular walls are sometimes employed for the confinement of fluids under relatively high pressures, as in hydraulic brakes for example, and as walls of this character are made of relatively thin metal, on the order of a few thousandths of an inch in thickness, it is desirable that the pressures on opposite sides of the same shall become equalized when a safe maximum pressure has been reached, so as to prevent the wall being overstressed or injured by excessive unbalanced pressures or excessive flexure.

It is an object of this invention to provide a flexible, corrugated tubular wall or bellow with means whereby the pressure within and without the same becomes automatically equalized upon a predetermined flexure of the wall.

Another object of this invention is to provide a flexible, corrugated tubular wall or bellows with means limiting the flexure of the wall and preventing the wall from becoming overstressed or injured by preventing the application of excessive unbalanced pressures thereto.

It is sometimes desirable to make a flexible, corrugated tubular wall of a construction or character which is not fluid tight; for example such a wall may be more or less pervious because formed by electrodeposition, or it may be composed of a plurality of elements which are connected by mechanical joints that are not fluid tight, as disclosed in the application of Weston M. Fulton, Serial Number 440,582, filed March 31, 1930, and entitled Flexible corrugated tubular metal wall and method of making the same. It is an object of the present invention to provide a wall of this character that may be used to confine a fluid, even though the fluid may be under considerable pressure.

Another object of this invention is to provide a flexible, corrugated tubular wall or bellows whereby the fluid confined thereby may be kept out of contact therewith, so as to prevent corrosion or other action of the fluid on the wall or bellows, leakage, etc.

Other objects of the invention will appear as the description of the invention proceeds.

The invention is capable of receiving a variety of mechanical expressions, two of which have been illustrated on the accompanying drawing, but it is to be expressly understood that the drawing is for purpose of illustration only and is not to be construed as a definition of the limits of the invention, reference being had to the appended claims for that purpose.

Referring in detail to the drawing:—

Fig. 1 is a more or less schematic axial section through an embodiment of the present invention, and Fig. 2 is a corresponding section through another embodiment of the present invention.

For purposes of illustration the present invention has been shown as applied to a construction suitable for use in hydraulic brakes, with the fluid pressure applied exteriorly of the flexible wall, but it is to be expressly understood that the invention is also applicable to flexible walls applied to other uses and to constructions wherein the fluid under pressure is applied interiorly of the flexible wall.

In the structures shown 10 is a rigid casing of any suitable size, construction and material, having a cap 11 screw-threaded thereon and a threaded aperture 12 at its opposite end, which may receive piping of any suitable character for conveying fluid thereto. The member to be actuated is diagrammatically illustrated as a stem 13 slidably projecting through an aperture 14 in the cap 11 and connected, integrally or otherwise, to a plate 15. Mounted within the casing 10 is a flexible, corrugated tubular wall 16 of any suitable material but preferably of a resilient metal such as brass for example and connected in any suitable way at one end to the plate 15 and at its opposite end to an annular plate 17 making a fluid tight joint with the casing 10. The flexible wall 16 may be of any suitable construction and may be formed in any suitable way; for example it may be a one-piece wall of the character well known in the art, or it may be composed of separate elements connected by mechanical joints as disclosed in the aforesaid application of Weston M. Fulton, etc.

It is sometimes desirable to prevent the confined fluid from coming in contact with the wall, as for example where corrosion or other chemical action on the wall, or leakage through the wall, is to be prevented. One feature of the present invention involves the provision of the wall 16 with means which insures against leakage through the wall, if the wall is not fluid tight, or which protects the wall from contact with the fluid confined thereby.

In the form shown in Fig. 1, the flexible wall 16 is provided with a casing 18 of elastic material of any suitable character, such as rubber. This casing of elastic material may be formed in any suitable way, but preferably takes the form of an integral mass so as to afford no joints through which fluid may leak. This mass of elastic material preferably fills the spaces or annular chambers which form the inwardly-directed corrugations, as shown, and also desirably extends over the outer face of the plate 15, so that the entire flexible wall and its end member are completely imbedded in an integral block of elastic material which projects into and fills the inwardly-directed corrugations. Such a block of elastic material may be molded about the flexible wall 16 in any suitable way, or it may be cast about said wall in a fluid state, etc.

The elastic material which thus encases the flexible wall prevents contact of the confined fluid therewith and therefore prevents leakage through the wall when the wall is pervious in character or includes joints which are not fluid tight, or it prevents contact of the confined fluid with the wall if there is a likelihood of corrosive or other chemical action of the fluid on the wall. If the fluid is to be applied to the wall interiorly, the elastic material may be similarly applied to the interior of the flexible wall, or under some conditions of service the elastic material may be applied to the flexible wall at the opposite side from that of the fluid to be confined, if contact of the fluid with the wall need not be prevented, although I prefer to apply the elastic material to the pressure side of the flexible wall.

I also preferably so construct the elastic casing for the flexible wall as to prevent flexure of the wall beyond a predetermined limit, by automatically limiting the unbalanced pressure on the wall when a predetermined pressure has been built up thereon, so as to prevent overstressing of or injury to the wall.

A suitable construction for effecting this function is illustrated in Fig. 2 wherein, in addition to the casing of elastic material 18 exteriorly of the wall, a second mass of elastic material 19 is provided interiorly of the wall and projects into the outwardly extending corrugations so as to completely fill the same, as shown. Said elastic mass 19 may be of the same material as used exteriorly of the wall or it may be of a different material, but I prefer to use rubber in both instances because it is substantially incompressible as well as readily deformable and elastic.

The volume of the elastic material interiorly of the flexible wall 16 is so selected with respect to the space which may be occupied by said material upon flexure of the wall and the resultant deformation of said elastic material, that at a predetermined flexure of the wall there is no further room for further deformation of said material whereupon, owing to the incompressibility of said material, further flexure of the wall is prevented. Referring to Fig. 2, the elastic material 19 fills the space within the flexible wall 16 except for a clearance 20 between the periphery of the stem 13 and the inner periphery of the elastic mass 19. Upon pressure being applied to the end of the flexible wall 16, said wall is collapsed axially, narrowing the corrugations and causing the elastic material 19 to be squeezed radially inward into the clearance 20 until it engages the periphery of the stem 13. Thereafter further deformation of the elastic mass is prevented because of its confinement, and as it is substantially incompressible, further flexure of the flexible wall is resisted, the reaction of the elastic material on the wall interiorly thereof now equalling the excess pressure of the fluid thereon exteriorly thereof. Deformation of the exterior elastic mass 18 is resisted by the pressure of the fluid thereon. Therefore further collapse of the flexible wall is positively prevented by preventing further deformation of the elastic casing thereof and any additional outside pressure is balanced by the inside pressure, this balance being maintained although the pressure exteriorly of the wall continues to increase, so that, by properly selecting the maximum space for possible deformation of the elastic mass 19, the maximum unbalanced pressure that may act on said wall, and the maximum flexure of said wall, may be exactly predetermined so as to insure against overstressing of said wall. In place of depending upon radial deformation of the plastic mass 19 as illustrated, provision may be made for limiting the deformation of said mass in any other suitable way.

It will now be apparent that an elastic mass 18 when used either exteriorly or interiorly of the wall as shown in Fig. 1 will also resist to a considerable extent the exertion of excessive pressures on the flexible wall, because the collapse of the wall is accompanied by an increasing tendency to squeeze the elastic material out of the corrugations, and this tendency is resisted by the elasticity of said material which tends to balance the pressure of the fluid on the flexible wall and limit the extent of flexure thereof. Also, when the fluid is in contact with the elastic mass the pressure of the fluid thereon resists deformation of that mass.

It will also be apparent that advantage may be taken of the feature of predeterminately balancing the internal and external pressures or predeterminately limiting the extent of flexure of the wall without taking advantage of the feature of protecting the wall against contact with the confined fluid to prevent leakage, corrosion, etc. For example, in Fig. 2, the interior mass 19 may alone be used and this mass could be composed of sections instead of an integral mass.

It will therefore be perceived that a flexible corrugated, tubular wall has been provided with means whereby the wall may be made of a pervious character or with mechanical joints which are not fluid tight and yet used to confine fluids, even though the fluid be under considerable pressure, and also protected against the action of the fluid on the material of the wall. It will also be perceived that means have been provided whereby the pressures interiorly and exteriorly of the wall may be balanced upon a predetermined pressure being built up, and whereby the flexure of the wall may be predeterminately limited while preventing an unbalanced excess pressure thereon to prevent overstressing or injury to the wall. These features may be used separately or conjointly. It is to be understood in referring to the casing in the claims, that the elastic material referred to may be on either or both sides of the corrugated wall.

While the embodiments of the invention illustrated on the drawing have been described with considerable particularity, it is to be expressly understood that the invention is not restricted thereto, as it is capable of receiving a variety of expressions, as will now be apparent to those skilled in the art, while changes may be made in the details of construction, arrangement and proportion of parts without departing from the spirit of this invention. Reference is therefore to be had to the claims hereto appended for a definition of said invention.

What is claimed is:

1. An axially expansible and collapsible, corrugated metallic bellows having relatively deep, flexible corrugations and provided with a casing of elastic material which substantially fills like corrugations and which is deformable but substantially incompressible, and means cooperating with said elastic material to limit the extent of its deformation in the direction of the radii of said bellows and thereby limit the collapse of said bellows by limiting the extent to which said elastic material may be extruded from said corrugations as a result of the squeezing action thereon of the lateral walls of said corrugations.

2. An axially expansible and collapsible, corrugated metallic bellows having relatively deep, flexible corrugations and provided with a casing of elastic material which substantially fills like corrugations and which is deformable but substantially incompressible, and a rigid abutment cooperating with said elastic material to limit the extent of its deformation in the direction of the radii of said bellows and thereby limit the collapse of said bellows by limiting the extent to which said elastic material may be extruded from said corrugations as a result of the squeezing action thereon of the lateral walls of said corrugations.

3. An axially expansible and collapsible, corrugated metallic bellows for confining a fluid and provided with relatively deep flexible corrugations, and means cooperating therewith when pressure has been applied to said fluid for limiting the unbalanced pressure acting on said bellows when said bellows has collapsed axially to a predetermined amount, said means including a casing of elastic material which projects into and substantially fills the corrugations and means cooperating with said elastic material to limit the extent to which said material is extruded from said corrugations.

4. An axially expansible and collapsible, corrugated metallic bellows for confining a fluid provided on the side opposite that exposed to the fluid with an elastic body of deformable but substantially incompressible material projecting into the corrugations, and a rigid abutment coacting with said material to limit its radial deformation whereby the pressure on said bellows becomes balanced when said bellows has collapsed axially to a predetermined amount.

5. An axially flexible, corrugated, tubular wall for confining a fluid and encased on the side opposite that exposed to the fluid with deformable but substantially incompressible elastic material which substantially fills the corrugations and tends to be squeezed therefrom upon collapse of said wall, and rigid means adapted to be engaged by said material to limit the extent to which said material may be squeezed from said corrugations.

6. An axially flexible, corrugated, tubular wall for confining a fluid and encased on both sides with deformable but substantially incompressible elastic material which substantially fills the corrugations and tends to be squeezed therefrom upon collapse of said wall, and rigid means adapted to be engaged by said material on the side of said wall opposite to that exposed to the pressure to limit the extent to which said material may be squeezed from said corrugations.

7. The combination with an extensible and collapsible tubular bellows having relatively-deep, axially-flexible corrugations for confining a fluid under variable pressures, of an elastic mass projecting into and substantially filling said corrugations and deformable but substantially incompressible upon a predetermined collapse of the bellows, and means for positively restraining said elastic mass to build up a counterpressure on the walls of said bellows and balance the fluid pressure in excess of a predetermined amount.

In testimony whereof I have signed this specification.

JEAN V. GIESLER.